United States Patent
Bohrer et al.

(10) Patent No.: US 8,762,126 B2
(45) Date of Patent: Jun. 24, 2014

(54) ANALYZING SIMULATED OPERATION OF A COMPUTER

(75) Inventors: Patrick J. Bohrer, Cedar Park, TX (US); Ahmed Gheith, Austin, TX (US); James L. Peterson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 623 days.

(21) Appl. No.: 12/984,704

(22) Filed: Jan. 5, 2011

(65) Prior Publication Data

US 2012/0173928 A1    Jul. 5, 2012

(51) Int. Cl.
*G06F 9/455*    (2006.01)
*G06F 11/36*    (2006.01)

(52) U.S. Cl.
CPC ................. *G06F 11/3636* (2013.01); *G06F 11/3648* (2013.01)
USPC .......... 703/23; 712/241; 712/214; 718/1; 718/102; 718/105; 718/100; 711/118; 711/122; 711/6; 711/141; 714/34; 714/100; 714/38.1; 714/47.3

(58) Field of Classification Search
None
See application file for complete search history.

(56) References Cited

U.S. PATENT DOCUMENTS

| | | | |
|---|---|---|---|
| 7,861,065 B2* | 12/2010 | Heil et al. | 712/214 |
| 7,991,978 B2* | 8/2011 | Kuesel et al. | 712/11 |
| 8,020,168 B2* | 9/2011 | Hoover et al. | 718/107 |
| 2004/0194077 A1* | 9/2004 | Bharadwaj et al. | 717/158 |
| 2008/0244328 A1* | 10/2008 | Bohizic et al. | 714/45 |
| 2009/0150890 A1 | 6/2009 | Yourst | |
| 2009/0260013 A1* | 10/2009 | Heil et al. | 718/103 |
| 2011/0145496 A1* | 6/2011 | Whaley et al. | 711/112 |
| 2012/0317551 A1* | 12/2012 | Hecht et al. | 717/128 |

OTHER PUBLICATIONS

Gregory Wright A single-chip multiprocessor architecture with hardware thread support University of Manchester, Department of Computer Science, Jan. 2001.*
Zhao et al. Optimizing Chip Multiprocessor Work Distribution Using Dynamic Compilation Euro-Par 2007, LNCS 4641, pp. 258-267.*
Bhansali, S. et al. "Framework for Instruction-Level Tracing and Analysis of Program Executions", VEE 2006. Proceedings of the Second International Conference on Virtual Execution Environments, 154-63, 2006, ACM, New York, NY, USA.
Maxwell Souza et al. "ISAMAP: Instruction Mapping Driven by Dynamic Binary Translation", AMAS-BT—3rd Workshop on Architectural and Microarchitectural Support for Binary Translation (2010).

(Continued)

*Primary Examiner* — Omar Fernandez Rivas
*Assistant Examiner* — Cuong Luu
(74) *Attorney, Agent, or Firm* — DeLizio Gilliam, PLLC

(57) ABSTRACT

Analyzing simulated operation of a computer including loading user-defined dynamically linked analysis libraries that each include specifications of events to be traced for analysis, including: executing, in separate hardware threads, one trace buffer handler for each analysis library, and associating, with each trace buffer handler, one or more analysis functions; translating static binary instructions for the simulated computer into binary instructions for the executing computer, including: inserting, into the translation, implementing code for each specification of an event to be traced and inserting, into the translation for each static instruction, a memory address of a separate static instruction buffer; executing the translation, including executing the implementing code and generating, in a trace buffer, one or more trace records for each specified event; and processing the trace buffer, including calling analysis functions and associating by the analysis functions through the separate static instruction buffers event analysis data with static instructions.

21 Claims, 7 Drawing Sheets

(56) References Cited

OTHER PUBLICATIONS

Jaewoong Chung et al. "Thread-Safe Dynamic Binary Translation using Transactional Memory", 2008 IEEE 14th International Symposium on High Performance Computer Architecture, 279-89, 2008, IEEE, Piscaatway, NJ, USA.

Wang, Kun et al. "Parallelization of IBM Mambo System Simulator in Functional Modes", Operating Systems Review (ACM), v 42, n 1, p. 71-76, Jan. 1, 2008, Association for Computing Machinery.

* cited by examiner

ANALYZING SIMULATED OPERATION OF A COMPUTER

BACKGROUND OF THE INVENTION

1. Field of the Invention

The field of the invention is data processing, or, more specifically, methods, apparatus, and products for analyzing simulated operation of a computer.

2. Description of Related Art

Today operation of a computer is, from time to time, simulated. Such may be the case, for example, when a computer program originally designed for execution by one type of processor is desired to be executed by another type of processor. Such simulation presently requires a great amount of computer processing overhead and computer resources. Further, user requirements for performance of such are becoming more difficult to achieve. In some instances, analysis of the simulation may be helpful to improve the simulated software or the simulation software itself. Such analysis however is currently inefficient and greatly impacts performance of the simulation itself.

SUMMARY OF THE INVENTION

Methods, apparatus, and products for analyzing simulated operation of a computer are disclosed in which operation of the computer is simulated on an executing computer and the executing computer includes a computer processor that in turn includes a plurality of hardware threads. In embodiments of the present invention, analyzing simulated operation of a computer includes loading, for execution, one or more user-defined dynamically linked analysis libraries, each analysis library including one or more specifications of events to be traced for analysis, including: executing, in separate hardware threads, one trace buffer handler for each analysis library, and associating, with each trace buffer handler, one or more analysis functions of the analysis library; translating static binary instructions for the simulated computer into binary instructions for the executing computer, including: inserting, into the translation, implementing code for each specification of an event to be traced and inserting, into the translation for each static instruction, a memory address of a separate static instruction buffer; executing the translation, including executing the implementing code thereby generating, in a trace buffer, one or more trace records for each specified event; and processing, by the trace buffer handlers, the trace buffer, including calling, by each trace buffer handler, analysis functions associated with the trace buffer handler, and associating by the analysis functions through the separate static instruction buffers event analysis data with static instructions.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
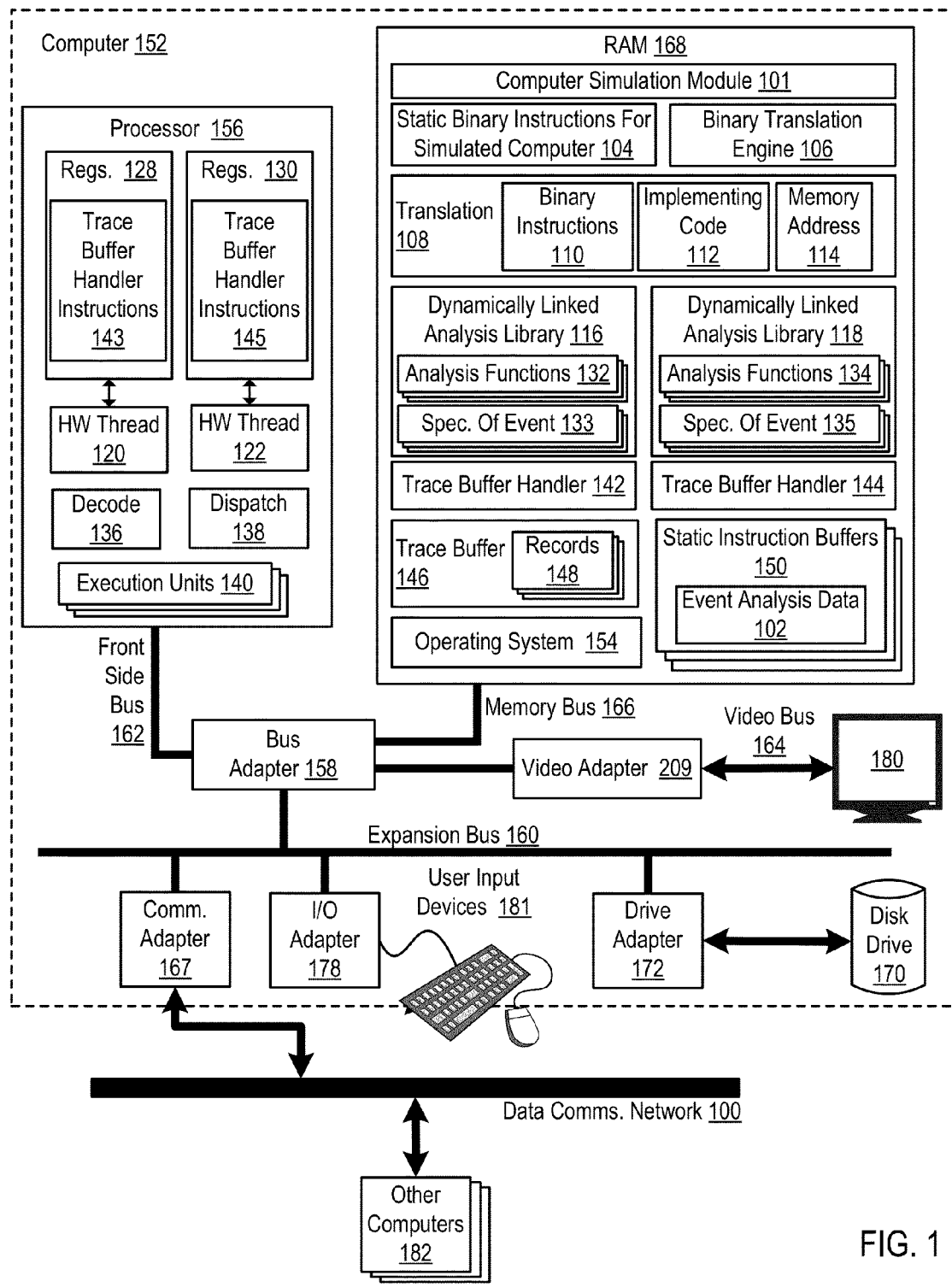
FIG. 1 sets forth a network diagram of a system for analyzing simulated operation of a computer according to embodiments of the present invention.

Exemplary methods, apparatus, and products for analyzing simulated operation of a computer in accordance with the present invention are described with reference to the accompanying drawings, beginning with FIG. 1. FIG. 1 sets forth a network diagram of a system for analyzing simulated operation of a computer according to embodiments of the present invention. The system of FIG. 1 includes automated computing machinery, a computer (152), configured simulate operation of a computer and analyze the simulated operation of the computer in accordance with embodiments of the present invention. In this specification a computer for which operation is simulated is referred to as the 'simulated computer' and a computer carrying out such simulation is referred to as an 'executing computer.' The computer (152) of FIG. 1 is an example of an 'executing computer.'

The example computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). The processor (156) in the example computer (152) of FIG. 1 includes a plurality of hardware threads (120, 122). Hardware threads provide physical means by which computer program instructions of software threads are executed. A software thread is the smallest unit of processing that can be scheduled by an operating system for execution on a processor. A software thread is typically contained inside a process. Multiple software threads can exist within the same process and share resources such as memory, while different processes do not share these resources. In particular, the software threads of a process share the process's instructions and context—values variables have at any given moment in execution. A 'hardware' thread, by contrast, is implemented in hardware of a computer processor and executes instructions of software threads. That is, support for a hardware thread is built into the processor itself in the form of a separate architectural register set for each hardware thread, so that each hardware thread can execute simultaneously with no need for context switches among the hardware threads. Each such hardware thread can run multiple software threads of execution implemented with the software threads assigned to portions of processor time called 'quanta' or 'time slots' and context switches that save the contents of a set of architectural registers for a software thread during periods when that software thread loses possession of its assigned hardware thread. In the example of FIG. 1, each of the hardware threads (120, 122) has a corresponding set of registers (128, 130).

In the example of FIG. 1, computer program instructions may be executed within a hardware thread (120, 122) through use of an instruction decoder (136), an instruction dispatcher (138), and execution units (140). An instruction decoder (136) is a network of static and dynamic logic within the processor (156) that retrieves instructions from registers in the register sets (128, 130) and decodes the instructions into microinstructions for execution on execution units (140) within the processor. An instruction to be decoded for execution, for example may include an opcode (operation code). An opcode is the portion of a machine language instruction that specifies the operation to be performed. Apart from the opcode itself, an instruction may also have one or more parameters, also called operands, on which the operation should act, although some operations may have implicit operands or none at all. Depending on the architecture of the processor upon which the opcode is decoded and executed, the operands may be register values, values in a call stack, other memory values, I/O ports, and the like. Once decoded, execution units (140) execute the microinstructions. Examples of execution units include LOAD execution units, STORE execution units, floating point execution units, execution units for integer arithmetic and logical operations, and so on. The computer processor (156) in the example of FIG. 1 also includes an instruction dispatcher (138) that arbitrates, in the presence of resource contention, priorities for dispatch of instructions from the hardware threads (120, 122, 124, and 126) of execution. The instruction dispatcher (138) is a network of static and dynamic logic within the processor (156) that dispatches microinstructions to the execution units (140) in the processor (156).

Stored in RAM (168) is a computer simulation module (101), a module of automated computing machinery comprising computer program instructions that, when executed, cause the computer (152) to operate as an executing computer—analyzing simulated operation of a computer in accordance with embodiments of the present invention. The computer simulation module (101) of FIG. 1 may carry out such analysis through use of other modules of automated computing machinery, included as part of the computer simulation module (101) or as separate, stand-alone modules. The example computer simulation module (101) of FIG. 1 operates for analyzing simulated operation of a computer in accordance with embodiments of the present invention by loading, for execution, one or more user-defined dynamically linked analysis libraries (116, 118). A dynamically linked library ('DLL') is a shared library loaded and linked to an executable computer program upon execution of the computer program rather than at compile-time. A library is a collection of subroutines, functions, or classes. Analysis libraries may be referred to in this specification as analysis DLLs for ease of explanation. Each analysis DLL (116, 118) in the example of FIG. 1 includes one or more specifications (133, 135) of events to be traced for analysis. Tracing is an act of logging information about a computer program's execution. Information logged during tracing may vary based on the an event that triggers the tracing. For example, a memory read or write event may cause information to be logged that varies from information logged upon a thrown exception or an hardware-level interrupt. Analysis DLLs are said to be user-defined in that a user may specify in the DLL the events to be traced and further may specify to the computer simulation module (101) the analysis DLLs to be loaded for simulation analysis. Using DLLs in this manner enables extensible and disparate simulation analysis by various users and groups of users.

In the example of FIG. 1, the computer simulation module (101), in loading the analysis DLLs, also executes, in separate hardware threads (128, 130), one trace buffer handler (142, 144) for each analysis library (116, 118) and associates, with each trace buffer handler (142, 144), one or more analysis functions (132, 134) of the analysis library (116, 118). The example trace buffer handlers (142, 144) are depicted in the system of FIG. 1 in two ways: as modules stored in RAM (168) and corresponding computer program instructions (143, 145) stored in registers (128, 130) of the processor (156) for execution in the hardware threads (120, 122). A trace buffer handler as the term is used in this specification is a module of computer program instructions that, when executed, analyzes a trace buffer—a data structure storing trace data.

Only two hardware threads (120, 122) are depicted in the example processor (156) of FIG. 1 for clarity, not limitation. Readers of skill in the art will recognize that processors useful in computers that operate for analyzing simulation of a computer in accordance with embodiments of the present invention may have any number (greater than one) of hardware threads. In some embodiments of the example of FIG. 1, for example, the processor (156) may also include a hardware thread dedicated solely to the execution of computer program instructions of the computer simulation module (101).

The example computer simulation module (101) of FIG. 1—through use of a binary translation engine (106)—also translates static binary instructions for the simulated computer into binary instructions for the executing computer. A static instruction is an instruction originally included in executable code of a computer program. A memory read or memory write, for example, may be a static instruction if originally included in executable source code. A static instruction is contrasted with a dynamic instruction. A dynamic instruction is an instruction not originally included in source code of a computer program, but generated dynamically, during execution of the computer program. Dynamic instructions are generated on-demand, effectively adding the instruction to executable source code during execution of the computer program. Conditional branch instructions, for example, may cause generation of other instructions—dynamic instructions. Just prior to run-time of a computer program, static instructions of the computer program are known, while dynamic instructions are not known. Dynamic instructions are not generated until the program is running.

The term 'binary' is used to here describe computer program instruction executable by a particular computer processor. That is, computer program instructions compiled for execution by a computer processor—referred to sometimes as machine code—rather than uncomplied, non-executable source code. Binary instructions of a computer to be simulated, for example, are instructions executable on a processor of the computer to be simulated.

In translating the static binary instructions (104), the binary translation engine (106) may insert, into the translation (108), implementing code (112) for each specification (133) of an event to be traced and insert, into the translation for each static instruction (104), a memory address (114) of a separate static instruction buffer (150). Implementing code (112) is a set of computer program instructions for tracing an event specified in the analysis DLLs. A static instruction buffer is a data structure designated to store event analysis data for each static instruction. Such event analysis data, for example, may include an event count for the static instruction buffer. A static instruction buffer may be thought of as a scratch pad for analysis DLLs to use during analysis of trace buffers.

The computer simulation module (101) may, after translating the static binary instructions for the simulated computer (104), execute the translation (108), including executing the implementing code (112) thereby generating, in a trace buffer (146), one or more trace records (148) for each specified event. That is, during execution of the translation, the computer simulation module (101) generates trace records for events specified by the analysis DLLS, by executing the implementing code in the translation.

The computer simulation module—through use of the trace buffer handlers (142)—may then process the trace buffer (146). A trace buffer handler may process the trace buffer (146) by iterating through records to identify specifications of events matching those in the trace buffer handler's associated analysis DLL and upon identification of such specifications, calling one or more analysis functions of the analysis DLL. Each trace buffer handler—being associated with a set of analysis functions of an analysis DLL—calls the analysis functions and associates through the separate static instruction buffers (150) event analysis data with static instructions. That is, each trace buffer handler may generate event analysis data (102) for a particular static instruction by calling an analysis function of an analysis DLL and may store the generated event analysis data in that static instruction's buffer (150). In this way, results of analyzing simulated computer operation may be fine-grained, on a per-static-instruction basis.

Also stored in RAM (168) is an operating system (154). An operating system is a computer software component that is responsible for execution of applications programs and for administration of access to computer resources, memory, processor time, and I/O functions, on behalf of application programs. Operating systems useful analyzing simulated operation of a computer according to embodiments of the present invention include UNIX™ Linux™ Microsoft XP™ AIX™ IBM's i5/OS™ and others as will occur to those of skill in the art. The operating system (154), computer simulation module (101), binary translation engine (106), trace buffer handlers (142, 144), analysis DLLs (116, 118), trace buffer (146), static instruction buffers (150), and static binary instruction for the simulated computer (104), and the translation (108) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for analyzing simulated operation of a computer according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for analyzing simulated operation of a computer according to embodiments of the present invention include modems for wired dial-up communications, Ethernet (IEEE 802.3) adapters for wired data communications network communications, and 802.11 adapters for wireless data communications network communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
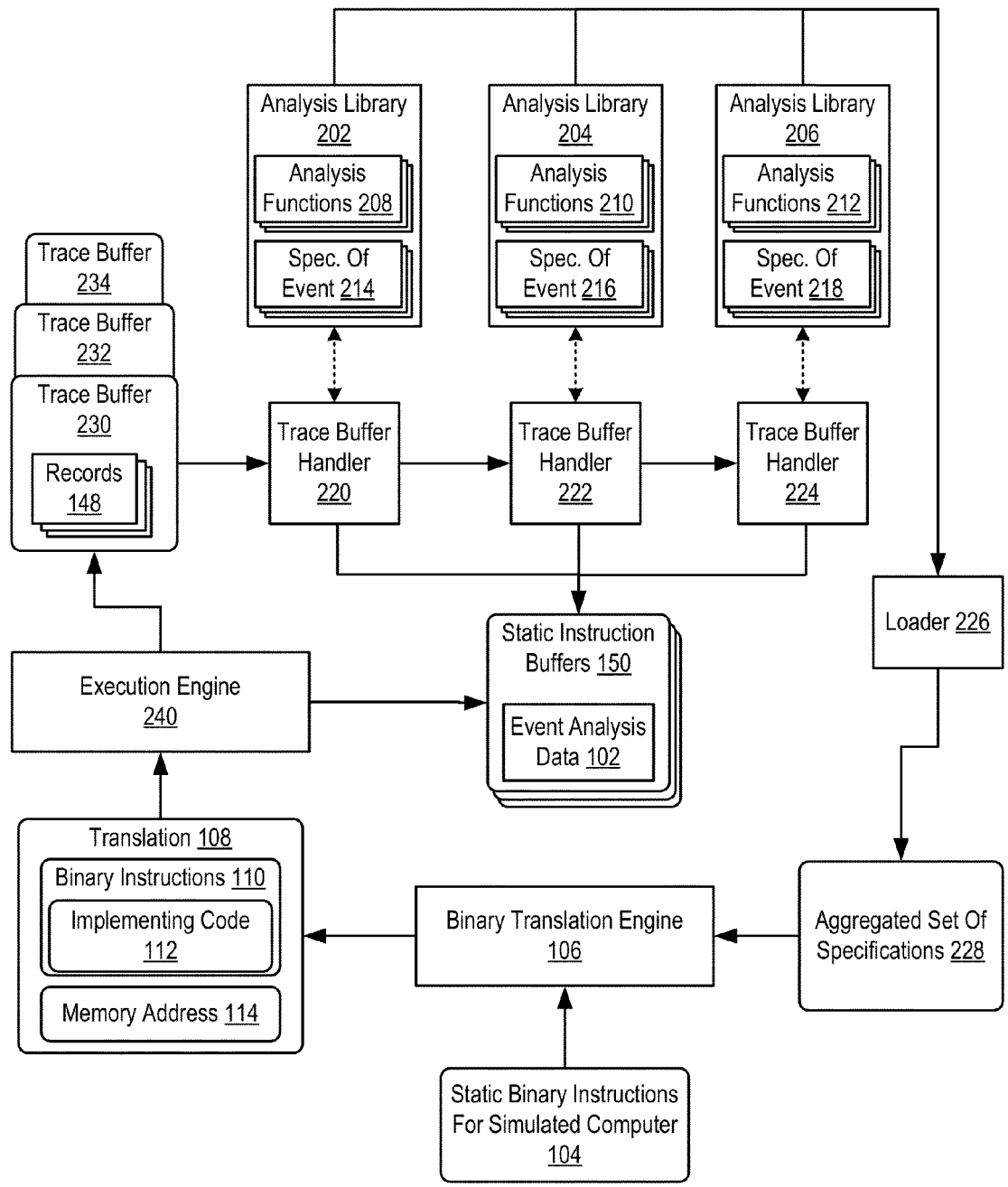
FIG. 2 sets forth a functional block diagram of an exemplary system for analyzing simulated operation of a computer according to embodiments of the present invention.

For further explanation, FIG. 2 sets forth a functional block diagram of an exemplary system for analyzing simulated operation of a computer according to embodiments of the present invention. The system of FIG. 2 includes loader (226) a module of computer program instructions that loads, for execution, one or more user-defined dynamically linked analysis libraries (202, 204, 206). In the example system of FIG. 2, each analysis library (202, 204, 206) includes specifications (214, 216, 218) of events to be traced for analysis. In loading the analysis libraries (2202, 204,206), the loader (226) executes, in separate hardware threads of a computer processor of an executing computer, one trace buffer handler (220, 222, 224) for each analysis library (202, 204, and 206). The loader (226) may also associate, with each trace buffer handler (220, 222, 224), one or more analysis functions (208, 210, 212) of the analysis library (202, 204, 206) associated with the trace buffer handler (220, 222, 224). In the system of FIG. 2, for example, that loader (226) loads the analysis library (202), executes the trace buffer handler (220) in a hardware thread, and associates the analysis functions (208) of the analysis library (202) with the trace buffer handler (220).

In loading the analysis libraries (202, 204, 206), the loader (226) also aggregates the one or more specifications (214, 216, 218) of events to be traced for analysis of each analysis library (202, 204, 206) into a single set of unique specifications—depicted in FIG. 2 as an aggregated set (228) of specifications. The specifications in the single, aggregated set of specifications are unique in that each specification is different from all other specifications—there are no duplicate specifications. In the example system of FIG. 2, separate analysis libraries may include the same specification of an event to be trace—a specification of a memory read to be traced, for example. In this way, the loader (226) effectively filters out all duplicates and provides a binary translation engine (106) with a single list of events to be traced.

The binary translation engine (106) of FIG. 2 comprises a module of computer program instructions that, when executed, translates static binary instructions (104) for the simulated computer into binary instructions for the executing computer (110). In translating the static binary instructions (104), the binary translation engine (106) also inserts, into the translation (108), implementing code (112) for each specification of an event to be traced—that is, code that when executed carries out a trace—and inserts, into the translation (108) for each static instruction, a memory address (114) of a separate static instruction buffer (150).

In the example of FIG. 2, the trace buffer handlers (220, 222, 224) may process the trace buffer (230) in parallel or serially. The trace buffer handlers (220, 222, 224) in the system of FIG. 2, for example, may process the trace buffer (230) serially, beginning with the trace buffer handler (220), proceeding with the trace buffer handler (222), and finishing processing with the trace buffer handler (224). In this way the trace buffer (230) is effectively 'handed-off' from one trace buffer handler to a subsequent trace buffer handler. This serial processing may be useful in embodiments, described below, in which the trace records are stored multiple trace buffers in a predefined order. In the system of FIG. 2, for example, trace records (148) may be stored in trace buffer (230) followed by trace buffer (232). In such an example, the trace buffer handlers (220, 222, 224) may process these trace buffers (230, 232) serially as follows: trace buffer handler (220) processes the trace buffer (230), passes the trace buffer (230) to trace buffer handler (222) for processing, and proceeds to process trace buffer (232) in parallel the processing of trace buffer (230) by trace buffer handler (222).

The system of FIG. 1 also includes an execution engine (240), a module of computer program instructions that executes the translation (108), including executing the implementing code (112). Upon implementing the executing code, the execution engine (240) generates, in a trace buffer (230), one or more trace records (148) for each specified event. In the example of FIG. 2, the trace buffer handlers (220, 222, 224), process the trace buffer (230) by calling analysis functions (208, 210, 212) associated with the trace buffer handler (220, 222, 224) and associating by the analysis functions (208, 210, 212) through the separate static instruction buffers (150) event analysis data (102) with static instructions.

As mentioned above, analyzing simulation of computer operation in accordance with embodiments of the present invention may be carried out with multiple trace buffers (230, 232, 234). In the system of FIG. 2, for example, the execution engine (240) may be configured to execute the translation up to a predetermined point of execution in the translation—such as the next 1000 instructions. In such embodiments, the predetermined point of execution may be established—by a user or a software module operable in the system of FIG. 2, for example—so that all trace records (148) generated during execution of the translation to the predetermined point of execution are stored in the trace buffer. In this way, testing for the end of trace buffer is avoided, reducing operational overhead. Trace buffers may be set to a predefined size—a size known to be so large that any number of trace records generated in executing a translation up to the predefined point of execution will fit in the trace buffer. After executing the translation to the predefined point of execution, the execution engine (240) may then provide the trace buffer (230) to the trace buffer handlers (220, 220, 224) for processing and resume execution of the translation (108) from the predetermined point of execution with another trace buffer (232). In the example of FIG. 2, the execution engine (240) may execute the translation (108) to a predefined point of execution, generating trace records (148) in trace buffer (230), and after executing to the predefined point, provide the trace buffer (230) to trace buffer handler (220). The execution engine (240) may then execute the translation (108) beginning from the predefined point to a subsequent predefined point, generating trace records in the trace buffer (232). During execution of this portion of the translation, the trace buffer handler (220) completes processing of the trace buffer (232) and passes the trace buffer along to trace buffer handler (222). After executing the translation (108) to the subsequent predefined point, the execution engine (240) may provide the trace buffer (232) to trace buffer handler (220), and resume execution, generating trace records in trace buffer (234), and so on as will occur to readers of skill in the art.

Figure 3:
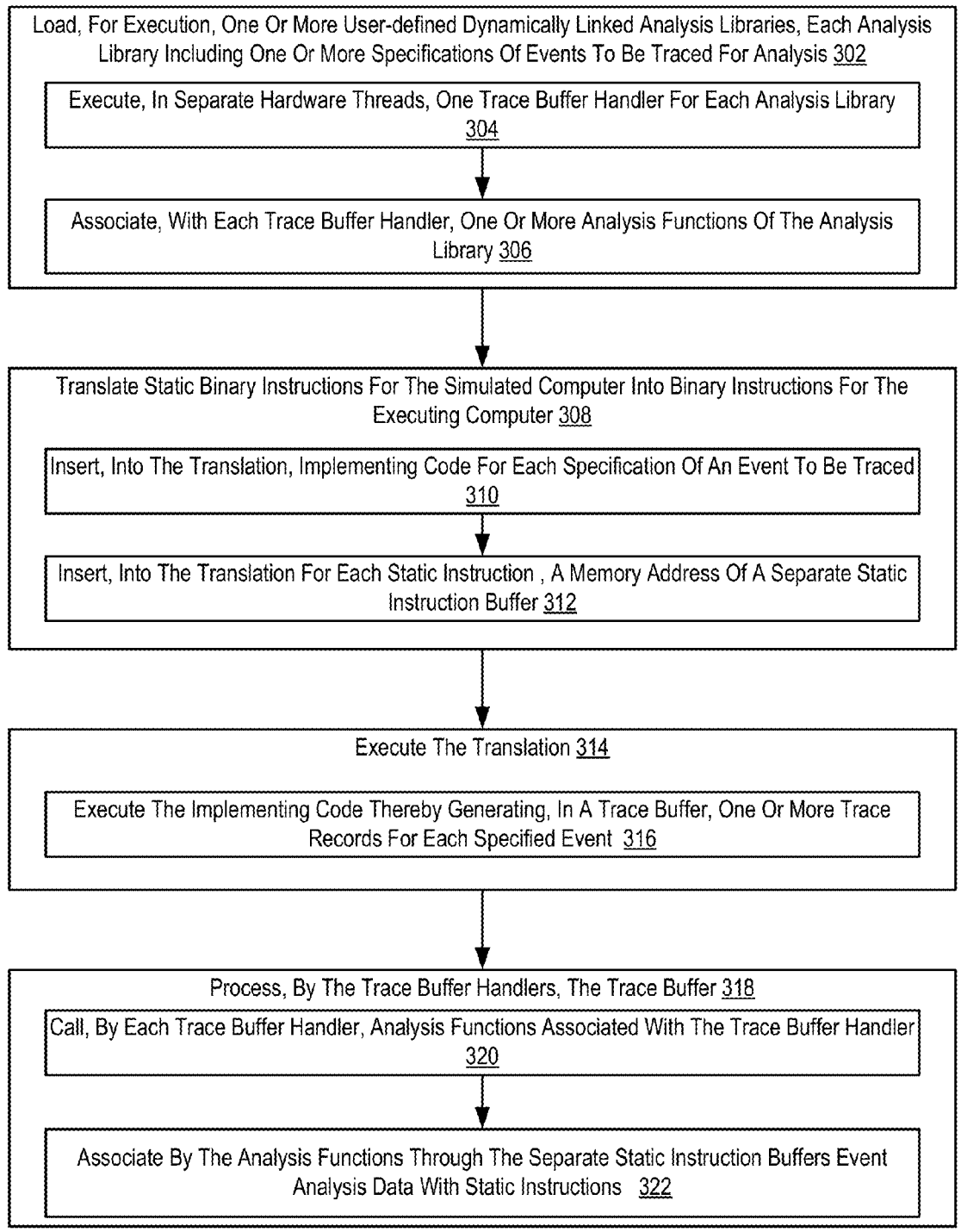
FIG. 3 sets forth a flow chart illustrating an exemplary method for analyzing simulated operation of a computer according to embodiments of the present invention.

For further explanation, FIG. 3 sets forth a flow chart illustrating an exemplary method for analyzing simulated operation of a computer according to embodiments of the present invention. In the method of FIG. 3, operation of the computer is simulated on an executing computer, such as the computer (152) in the example of FIG. 1. Such an executing computer includes a computer processor (156 on FIG. 1) that, in turn, includes a plurality of hardware threads (120, 122), The method of FIG. 3 includes loading (302), for execution, one or more user-defined dynamically linked analysis libraries. In method of FIG. 3, each analysis library includes one or more specifications of events to be traced for analysis. In the method of FIG. 3, loading (302) dynamically linked analysis libraries includes executing (304), in separate hardware threads, one trace buffer handler for each analysis library and associating (306), with each trace buffer handler, one or more analysis functions of the analysis library. Executing (304), in separate hardware threads, one trace buffer handler for each analysis library may be carried out with system calls to an operating system thread scheduler.

The method of FIG. 3 also includes translating (308) static binary instructions for the simulated computer into binary instructions for the executing computer. In the example of FIG. 3, translating (308) static binary instructions for the simulated computer into binary instructions for the executing computer includes inserting (310), into the translation, implementing code for each specification of an event to be traced and inserting (312), into the translation for each static instruction, a memory address of a separate static instruction buffer.

The method of FIG. 3 also includes executing (316) the translation. In the example of FIG. 3, executing (316) the translation includes executing the implementing code in the translation, thereby generating (316), in a trace buffer, one or more trace records for each specified event.

The method of FIG. 3 also includes processing (318), by the trace buffer handlers, the trace buffer. In the method of FIG. 3, processing (318) the trace buffer is carried out by calling (320), by each trace buffer handler, analysis functions associated with the trace buffer handler and associating (322) by the analysis functions through the separate static instruction buffers event analysis data with static instructions.

Figure 4:
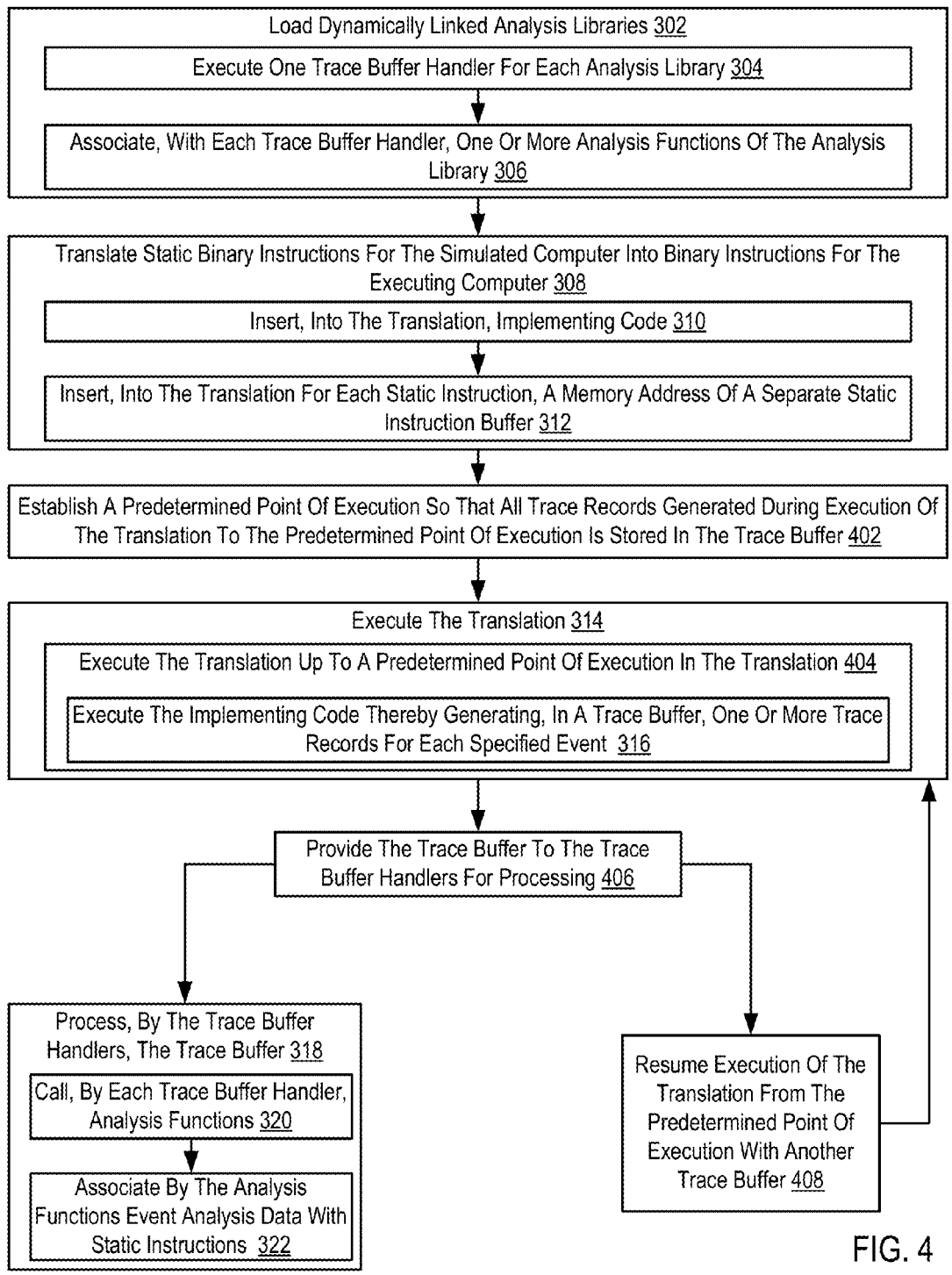
FIG. 4 sets forth a flow chart illustrating a further exemplary method for analyzing simulated operation of a computer according to embodiments of the present invention.

For further explanation, FIG. 4 sets forth a flow chart illustrating a further exemplary method for analyzing simulated operation of a computer according to embodiments of the present invention. The method of FIG. 4 is similar to the method of FIG. 3, in that the method of FIG. 4 includes loading (302), for execution, one or more user-defined dynamically linked analysis libraries; translating (308) static binary instructions; executing (316) the translation; and processing (318) the trace buffer.

The method of FIG. 4 differs from the method of FIG. 3, however, in that the method of FIG. 4 includes establishing (402) a predetermined point of execution so that all trace records generated during execution of the translation to the predetermined point of execution are stored in the trace buffer. Establishing (402) the predetermined point of execution may be carried out by determining a size of a trace buffer and, through testing, determining an average number of instructions that may be executed and for which trace records are generated and are stored in the trace buffer.

In the method of FIG. 4, executing (314) the translation is carried out by executing (404) the translation up to a predetermined point of execution in the translation. After executing (404) the translation to the predefined point of executing, the method of FIG. 4 continues by providing (406) the trace buffer to the trace buffer handlers for processing and resuming (408) execution of the translation from the predetermined point of execution with another trace buffer. Providing (406) a trace buffer to a trace buffer handler may be carried out by providing a pointer, a memory address and offset of the trace buffer to the handler and in other ways as will occur to readers of skill in the art. In the method of FIG. 4, the trace buffer handlers process (318) the trace buffer in parallel with the resumed execution (408) of the translation.

Figure 5:
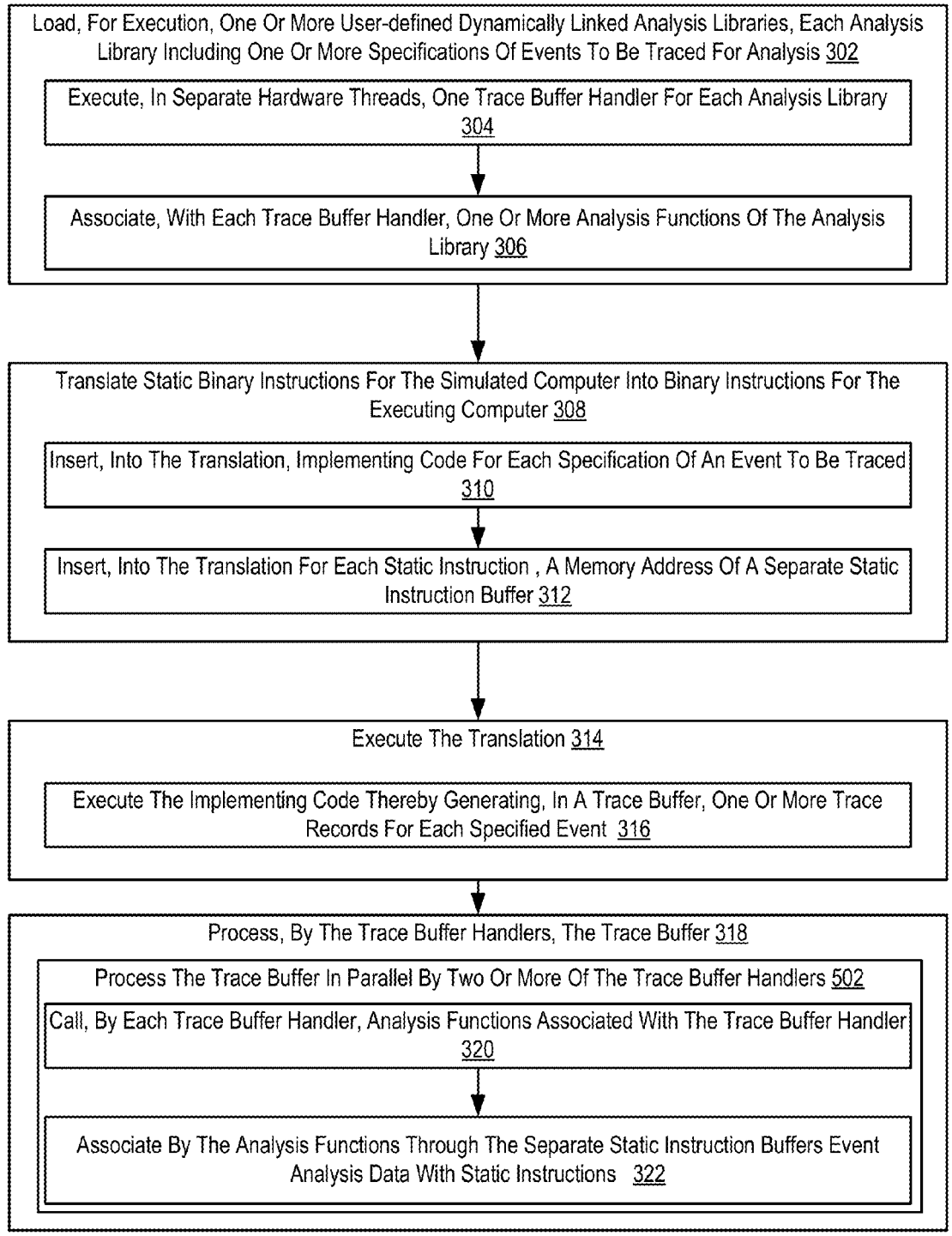
FIG. 5 sets forth a flow chart illustrating a further exemplary method for analyzing simulated operation of a computer according to embodiments of the present invention.

For further explanation, FIG. 5 sets forth a flow chart illustrating a further exemplary method for analyzing simulated operation of a computer according to embodiments of the present invention. The method of FIG. 5 is similar to the method of FIG. 3, in that the method of FIG. 5 includes loading (302), for execution, one or more user-defined dynamically linked analysis libraries; translating (308) static binary instructions; executing (316) the translation; and processing (318) the trace buffer. The method of FIG. 5 differs from the method of FIG. 3, however, in that in the method of FIG. 5, processing (318) the trace buffer is carried out by processing (502) the trace buffer in parallel by two or more of the trace buffer handlers (502). For improved efficiency in processing a trace buffer, and due to the separately executing nature (in separate hardware threads), two or more separate trace buffer handlers may process the same trace buffer—a data structure—at the same time. In this way, multiple different analyses of one set of trace data may be carried out simultaneously.

Figure 6:
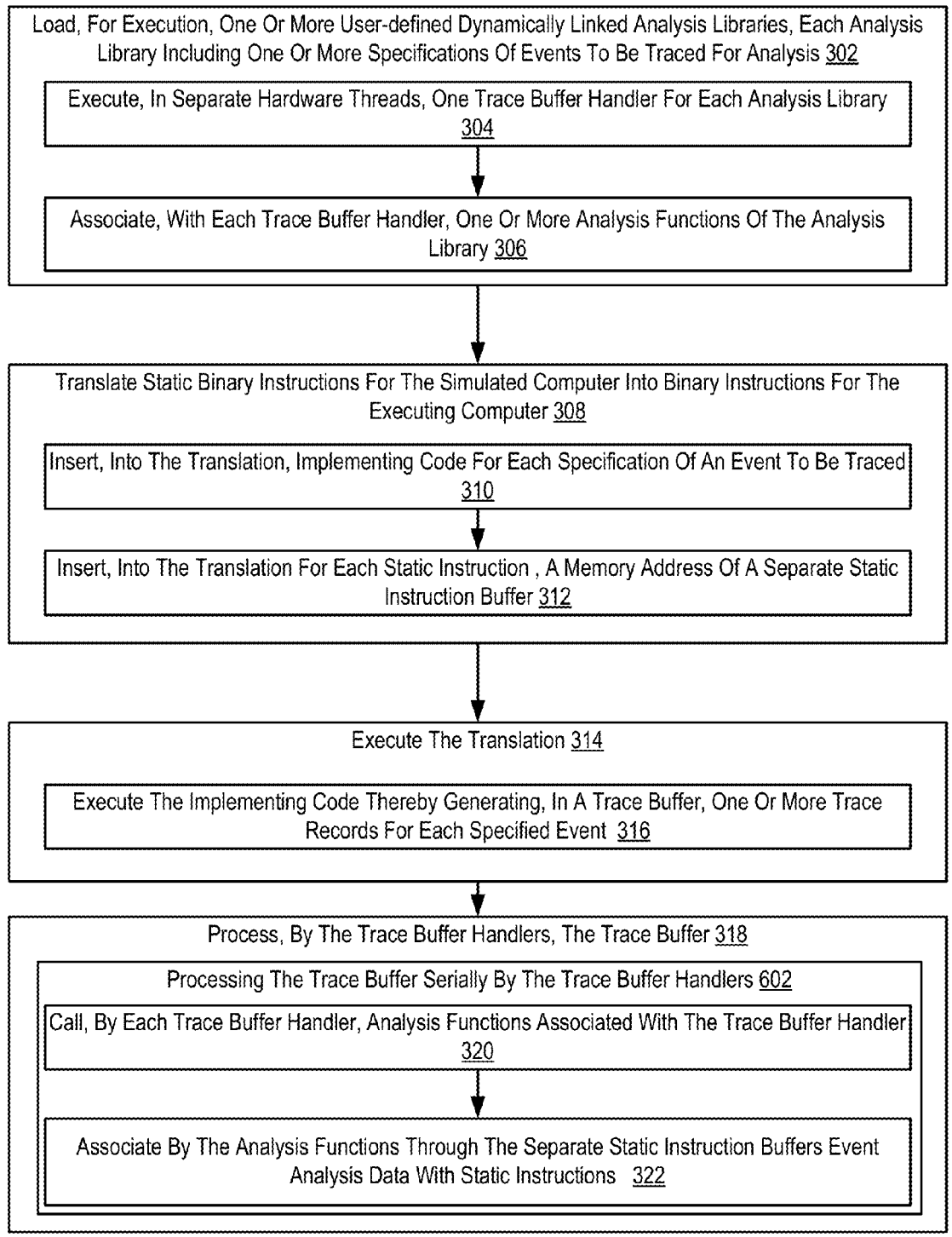
FIG. 6 sets forth a flow chart illustrating a further exemplary method for analyzing simulated operation of a computer according to embodiments of the present invention.

For further explanation, FIG. 6 sets forth a flow chart illustrating a further exemplary method for analyzing simulated operation of a computer according to embodiments of the present invention. The method of FIG. 6 is similar to the method of FIG. 3, in that the method of FIG. 6 includes loading (302), for execution, one or more user-defined dynamically linked analysis libraries; translating (308) static binary instructions; executing (316) the translation; and processing (318) the trace buffer.

The method of FIG. 6 differs from the method of FIG. 3, however, in that in the example of FIG. 6, the processing (318) the trace buffer is carried out by processing (602) the trace buffer serially by the trace buffer handlers. That is, in the method of FIG. 6, one trace buffer handler processes a trace buffer and passes the trace buffer along to a subsequent trace buffer handler for processing. Once the receiving trace buffer handler process the trace buffer, the trace buffer handler passes along the trace buffer to a subsequent trace buffer handler for processing and so on until all trace buffer handlers have processed the trace buffer. Reader of skill in the art will recognize, that although the method of FIG. 6 is limited to processing a single trace buffer serially among the trace buffer handlers, multiple trace buffers may be processed in parallel. That is, trace buffer handlers in accordance with the method of FIG. 6 process a single trace buffer serially, but may process multiple trace buffers in parallel. For example, a first trace buffer handler, may process a third trace buffer, in parallel with a second trace buffer handler processing a second trace buffer, in parallel with a third trace buffer handler processing a second Consider, for further explanation, Table 1 below which sets forth a trace buffer processing timing diagram,

TABLE 1

Trace Buffer Processing Timing Diagram

| Time | Trace Buffer Handler_1 | Trace Buffer Handler_2 | Trace Buffer Handler_3 |
| --- | --- | --- | --- |
| 1 | TB_1 | | |
| 2 | TB_2 | TB_1 | |
| 3 | TB_3 | TB_2 | TB_1 |
| 4 | | TB_3 | TB_2 |
| 5 | | | TB_3 |

The example table above sets forth a processing timing diagram for three trace buffer handlers (Trace Buffer Handler_1, Trace Buffer Handler_2, and Trace Buffer Handler_3) processing three trace buffers (TB_1, TB_2, and TB_3) over five timing intervals. At time 1, Trace Buffer Handler_1 process TB_1, while Trace Buffer Handler_2 and Trace Buffer Handler_3 process nothing. Trace Buffer Handler_1, upon completion of processing TB_1, passes, at time 2, TB_1 along to Trace Buffer Handler_2. Trace Buffer Handler_1 and Trace Buffer Handler_2 process separate trace buffers in parallel during time 2: Trace Buffer Handler_1 processes TB_2 and Trace Buffer Handler_2 processes TB_1.

At time 3, Trace Buffer Handler_2 passes TB_1 to Trace Buffer Handler_3 for processing and Trace Buffer Handler_1 passes TB_2 to Trace Buffer Handler_2 for processing. During time 3, all trace buffer handlers process separate trace buffers in parallel: Trace Buffer Handler_1 processes TB_3; Trace Buffer Handler_2 processes TB_2; and Trace Buffer Handler_3 processes TB_3.

At time 4, Trace Buffer Handler_1 passes TB_3 to Trace Buffer Handler_2 for processing and Trace Buffer Handler_2 passes TB_2 to Trace Buffer Handler_3 for processing. During time 4, Trace Buffer Handler_2 and Trace Buffer Handler_3 process separate trace buffers in parallel: Trace Buffer Handler_2 processes TB_3 and Trace Buffer Handler_3 process TB_2. At time 5, Trace Buffer Handler_2 passes TB_3 to Trace Buffer Handler_3 for processing.

In this way each trace buffer is processed serially by the trace buffer handlers. TB_1 for example, begins with Trace Buffer Handler_1, proceeds to Trace Buffer Handler_2, and ends with Trace Buffer Handler_3. In addition, separate trace buffers are processed in parallel by separate trace buffer handlers.

Figure 7:
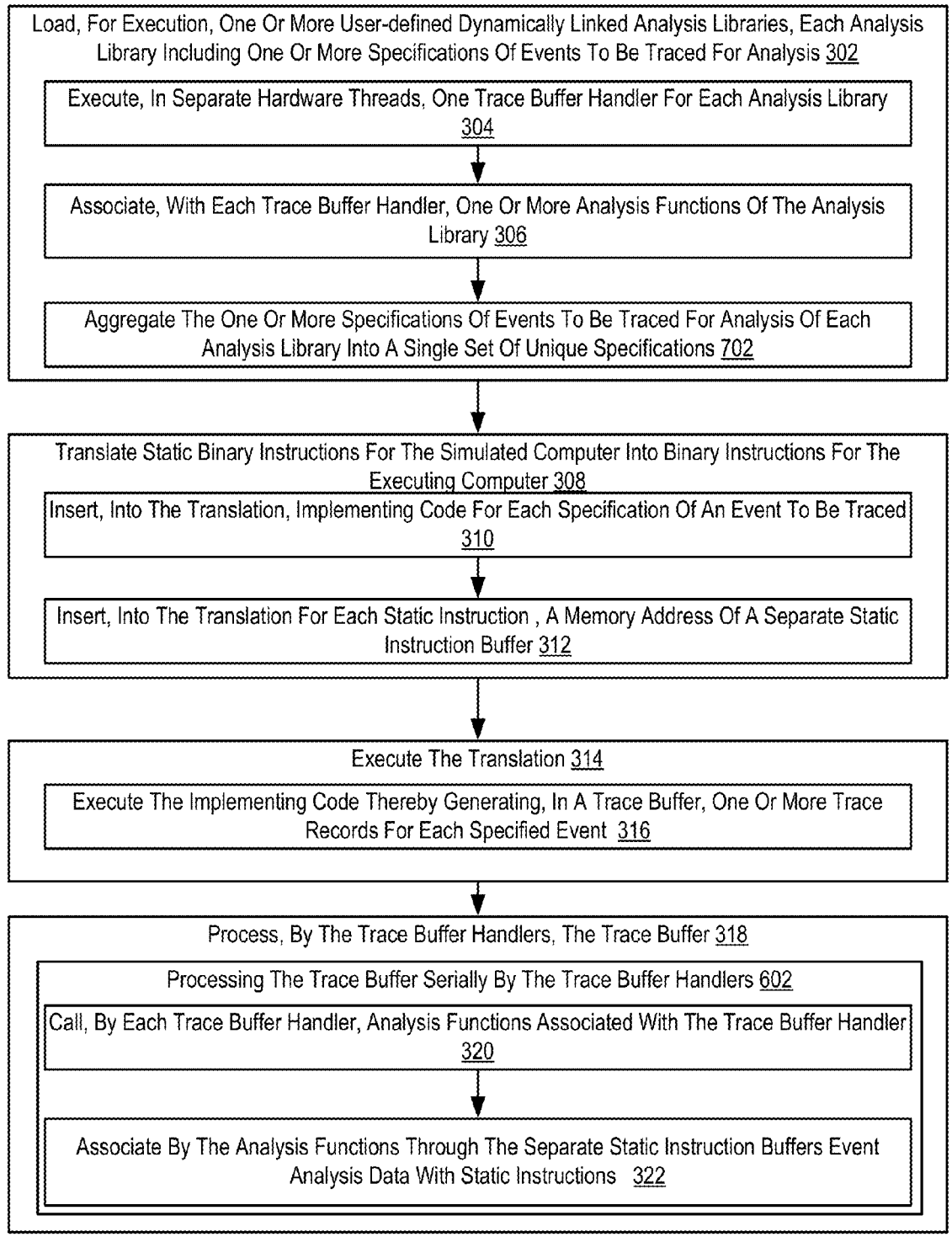
FIG. 7 sets forth a flow chart illustrating a further exemplary method for analyzing simulated operation of a computer according to embodiments of the present invention.

For further explanation, FIG. 7 sets forth a flow chart illustrating a further exemplary method for analyzing simulated operation of a computer according to embodiments of the present invention. The method of FIG. 7 is similar to the method of FIG. 3, in that the method of FIG. 7 includes loading (302), for execution, one or more user-defined dynamically linked analysis libraries; translating (308) static binary instructions; executing (316) the translation; and processing (318) the trace buffer.

The method of FIG. 7 differs from the method of FIG. 3, however, the method of FIG. 7 loading (302) the one or more user-defined dynamically linked analysis libraries includes aggregating (702) the one or more specifications of events to be traced for analysis of each analysis library into a single set of unique specifications. In this way, a single list of non-repeating specified events to be traced is generated and used to insert implementing code into the translation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of analyzing operation of a simulated computer, the method comprising:
    loading, for execution on an executing computer simulating operation of the simulated computer, one or more user-defined dynamically linked analysis libraries, each analysis library comprising one or more specifications of events to be traced for analysis and one or more analysis function to be carried out by one or more trace buffer handlers;
    aggregating the one or more specifications of events to be traced for analysis from the one or more analysis libraries into a set of specifications, wherein the set of specifications is filtered to remove duplicates;
    translating static binary instructions for the simulated computer into binary instructions for the executing computer, including: inserting, into the translation, implementing code for each specification of an event to be traced;
    executing the translation, including executing the implementing code thereby generating, in a trace buffer, one or more trace records for each specified event; and
    processing, by the trace buffer handlers, the trace buffer including calling, by each trace buffer handler, analysis functions associated with the trace buffer handler.

2. The method of claim 1 wherein:
    the executing computer further comprises a computer processor that includes a plurality of hardware threads; and
    loading, for execution on an executing computer simulating operation of the simulated computer, one or more user-defined dynamically linked analysis libraries further comprises executing, in separate hardware threads, one trace buffer handler for each analysis library and associating, with each trace buffer handler, one or more analysis functions of the analysis library.

3. The method of claim 1 wherein:
    translating static binary instructions further comprises inserting, into the translation for each static instruction, a memory address of a separate static instruction buffer; and
    processing, by the trace buffer handlers, the trace buffer further comprises associating by the analysis functions through the separate static instruction buffers event analysis data with static instructions.

4. The method of claim 1 wherein executing the translation further comprises executing the translation up to a predetermined point of execution in the translation.

5. The method of claim 4 further comprising:
    establishing the predetermined point of execution so that all trace records generated during execution of the translation to the predetermined point of execution are stored in the trace buffer;
    after executing the translation to the predetermined point of executing, providing the trace buffer to the trace buffer handlers for processing; and
    resuming execution of the translation from the predetermined point of execution with another trace buffer.

6. The method of claim 1 wherein processing the trace buffer further comprises processing the trace buffer in parallel by two or more of the trace buffer handlers.

7. The method of claim 1 wherein processing the trace buffer further comprises processing the trace buffer serially by the trace buffer handlers.

8. An apparatus for analyzing operation of a simulated computer, the apparatus comprising a computer processor, a computer memory operatively coupled to the computer processor, the computer memory having disposed within it computer program instructions configured, when executed by the computer processor, to cause the apparatus to carry out the operations of:
    loading, for execution on an executing computer simulating operation of the simulated computer, one or more user-defined dynamically linked analysis libraries, each analysis library comprising one or more specifications of events to be traced for analysis and one or more analysis function to be carried out by one or more trace buffer handlers;
    aggregating the one or more specifications of events to be traced for analysis from the one or more analysis libraries into a set of specifications, wherein the set of specifications is filtered to remove duplicates;
    translating static binary instructions for the simulated computer into binary instructions for the executing computer, including: inserting, into the translation, implementing code for each specification of an event to be traced;
    executing the translation, including executing the implementing code thereby generating, in a trace buffer, one or more trace records for each specified event; and
    processing, by the trace buffer handlers, the trace buffer including calling, by each trace buffer handler, analysis functions associated with the trace buffer handler.

9. The apparatus of claim 8 wherein:
    the executing computer further comprises a computer processor that includes a plurality of hardware threads; and
    loading, for execution on an executing computer simulating operation of the simulated computer, one or more user-defined dynamically linked analysis libraries further comprises executing, in separate hardware threads, one trace buffer handler for each analysis library and associating, with each trace buffer handler, one or more analysis functions of the analysis library.

10. The apparatus of claim 8 wherein:
    translating static binary instructions further comprises inserting, into the translation for each static instruction, a memory address of a separate static instruction buffer; and
    processing, by the trace buffer handlers, the trace buffer further comprises associating by the analysis functions through the separate static instruction buffers event analysis data with static instructions.

11. The apparatus of claim 8 wherein executing the translation further comprises executing the translation up to a predetermined point of execution in the translation.

12. The apparatus of claim 11 further comprising computer program instructions configure, when executed by the computer processor, to cause the apparatus to carry out the steps of:
    establishing the predetermined point of execution so that all trace records generated during execution of the translation to the predetermined point of execution are stored in the trace buffer;
    after executing the translation to the predetermined point of executing, providing the trace buffer to the trace buffer handlers for processing; and
    resuming execution of the translation from the predetermined point of execution with another trace buffer.

13. The apparatus of claim 8 wherein processing the trace buffer further comprises processing the trace buffer in parallel by two or more of the trace buffer handlers.

14. The apparatus of claim 8 wherein processing the trace buffer further comprises processing the trace buffer serially by the trace buffer handlers.

15. A computer program product for analyzing operation of a simulated computer, the computer program product disposed upon a computer readable memory, the computer program product comprising computer program instructions configured, when executed, to cause a computer to carry out the operations of:
- loading, for execution on an executing computer simulating operation of the simulated computer, one or more user-defined dynamically linked analysis libraries, each analysis library comprising one or more specifications of events to be traced for analysis and one or more analysis function to be carried out by one or more trace buffer handlers;
- aggregating the one or more specifications of events to be traced for analysis from the one or more analysis libraries into a set of specifications, wherein the set of specifications is filtered to remove duplicates;
- translating static binary instructions for the simulated computer into binary instructions for the executing computer, including: inserting, into the translation, implementing code for each specification of an event to be traced;
- executing the translation, including executing the implementing code thereby generating, in a trace buffer, one or more trace records for each specified event; and
- processing, by the trace buffer handlers, the trace buffer including calling, by each trace buffer handler, analysis functions associated with the trace buffer handler.

16. The computer program product of claim 15 wherein:
- the executing computer further comprises a computer processor that includes a plurality of hardware threads; and
- loading, for execution on an executing computer simulating operation of the simulated computer, one or more user-defined dynamically linked analysis libraries further comprises executing, in separate hardware threads, one trace buffer handler for each analysis library and associating, with each trace buffer handler, one or more analysis functions of the analysis library.

17. The computer program product of claim 15 wherein:
- translating static binary instructions further comprises inserting, into the translation for each static instruction, a memory address of a separate static instruction buffer; and
- processing, by the trace buffer handlers, the trace buffer further comprises associating by the analysis functions through the separate static instruction buffers event analysis data with static instructions.

18. The computer program product of claim 15 wherein executing the translation further comprises executing the translation up to a predetermined point of execution in the translation.

19. The computer program product of claim 18 further comprising computer program instructions configured, when executed, to cause the computer to carry out the steps of:
- establishing the predetermined point of execution so that all trace records generated during execution of the translation to the predetermined point of execution are stored in the trace buffer;
- after executing the translation to the predetermined point of executing, providing the trace buffer to the trace buffer handlers for processing; and
- resuming execution of the translation from the predetermined point of execution with another trace buffer.

20. The computer program product of claim 15 wherein processing the trace buffer further comprises processing the trace buffer in parallel by two or more of the trace buffer handlers.

21. The computer program product of claim 15 wherein processing the trace buffer further comprises processing the trace buffer serially by the trace buffer handlers.

* * * * *